(12) United States Patent
Coleman et al.

(10) Patent No.: US 11,173,526 B2
(45) Date of Patent: Nov. 16, 2021

(54) AUTOMATED STRUCTURAL LASER CLEANING SYSTEM

(71) Applicant: Lockheed Martin Corporation, Bethesda, MD (US)

(72) Inventors: David Haynes Coleman, Weatherford, TX (US); Michael Bryan Stoddard, Fort Worth, TX (US); Jeffrey P. Langevin, Fort Worth, TX (US); Steven E. Twaddle, Fort Worth, TX (US); Alexandria Zoe Arthur, Williamsburg, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 16/777,296

(22) Filed: Jan. 30, 2020

(65) Prior Publication Data

US 2021/0154709 A1  May 27, 2021

Related U.S. Application Data

(60) Provisional application No. 62/941,265, filed on Nov. 27, 2019.

(51) Int. Cl.
*B08B 7/00* (2006.01)
*B08B 5/04* (2006.01)
(Continued)

(52) U.S. Cl.
CPC .............. *B08B 7/0042* (2013.01); *B08B 5/04* (2013.01); *B08B 7/04* (2013.01); *B23K 26/36* (2013.01); *H01S 3/005* (2013.01); *H01S 3/02* (2013.01)

(58) Field of Classification Search
CPC .......... H01S 3/02; H01S 3/005; B23K 26/36; B08B 7/04; B08B 5/04; B08B 7/0042
(Continued)

(56) References Cited

U.S. PATENT DOCUMENTS 5,662,762 A  9/1997 Ranalli
5,782,253 A  7/1998 Cates et al.
(Continued)

FOREIGN PATENT DOCUMENTS

DE      202 09 305 U1   8/2002
WO   WO 2013/141810 A1   9/2013

OTHER PUBLICATIONS

EPO Communication, Application No. 20199053.8-1016, extended European Patent Search Report dated Jul. 29, 2021.

*Primary Examiner* — Dana Ross
*Assistant Examiner* — Joseph W Iskra
(74) *Attorney, Agent, or Firm* — Baker Botts L.L.P.

(57) ABSTRACT

In one embodiment, systems and methods include using an automated laser system to remove a portion of a coating for nutplate installation. An automated laser system comprises a laser scanner and a laser head, wherein the laser head is coupled to the laser scanner. The laser head comprises a containment unit and a vacuum connector wherein the vacuum connector is disposed on a first side of the containment unit. The laser head further comprises a camera system, a light source, a first actuator, and a second actuator all disposed on a top surface of the containment unit. The laser head further comprises an end piece, wherein the second actuator is configured to displace the end piece.

20 Claims, 3 Drawing Sheets

(51) Int. Cl.
*B08B 7/04* (2006.01)
*B23K 26/36* (2014.01)
*H01S 3/00* (2006.01)
*H01S 3/02* (2006.01)

(58) Field of Classification Search
USPC .................................................. 372/38.02
See application file for complete search history.

(56) References Cited

U.S. PATENT DOCUMENTS

| | | | |
|---|---|---|---|
| 5,986,234 A | 11/1999 | Matthews et al. | |
| 6,274,874 B1 | 8/2001 | Sidhu | |
| 6,288,362 B1 * | 9/2001 | Thomas | B08B 7/0042 134/1 |
| 6,369,353 B1 * | 4/2002 | Soska | B08B 7/0042 219/121.68 |
| 6,384,370 B1 * | 5/2002 | Tsunemi | B08B 7/0042 219/121.69 |
| 7,525,065 B2 | 4/2009 | Engler et al. | |
| 9,481,052 B2 | 11/2016 | Thomas et al. | |
| 9,945,253 B2 | 4/2018 | Gutierrez, Jr. et al. | |
| 10,016,792 B2 | 7/2018 | Tracey et al. | |
| 10,081,078 B2 | 9/2018 | Sprentall et al. | |
| 10,112,257 B1 | 10/2018 | Thomas et al. | |
| 10,363,586 B2 | 7/2019 | Barclay | |
| 2007/0000885 A1 | 1/2007 | Thomas et al. | |
| 2018/0369879 A1 | 12/2018 | Coleman et al. | |
| 2019/0143382 A1 | 5/2019 | Johnson et al. | |
| 2019/0275568 A1 | 9/2019 | Barclay | |
| 2020/0094352 A1 * | 3/2020 | Batarseh | B23K 26/0884 |

\* cited by examiner

AUTOMATED STRUCTURAL LASER CLEANING SYSTEM

CROSS-REFERENCE TO RELATED APPLICATION

The present application claims priority to U.S. application Ser. No. 62/941,265, filed on Nov. 27, 2019, which is herein incorporated by reference in its entirety.

TECHNICAL FIELD

This disclosure generally relates to surface coatings, and more specifically to an automated system for cleaning one or more sections of understructure for the application of nutplates.

BACKGROUND

Coatings of various types may be applied to surfaces of structures and vehicles to alter or enhance properties of respective surfaces. For example, some coatings may be applied to provide a weather-resistant layer to protect the underlaying structure. As another example, a coating may be applied to reduce vibrations or other deleterious effects during operation of an aircraft.

These coatings may be applied to one or more panels prior to installing said panels to the aircraft. Typically, there are predrilled holes in the one or more panels for fastener installation. In order to maximize efficiency, the coatings have been applied first over the one or more panels. A later manufacturing step is to install a plurality of nutplates onto the one or more sections of understructure so as to fasten down the one or more panels to the aircraft. Before installing the plurality of nutplates, the coatings applied to the one or more sections of understructure have to be removed around the area where the plurality of nutplates are to be installed so as to provide better bonding strength for a given adhesive to be used to couple the plurality of nutplates to the one or more sections of understructure. There exists a problem wherein manual surface preparation methods lead to variations in bonding strength of the adhesive, resulting in disbonded nutplates.

BRIEF DESCRIPTION OF THE DRAWINGS

To assist in understanding the present disclosure, reference is now made to the following description taken in conjunction with the accompanying drawings, in which.

DETAILED DESCRIPTION

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 3B, where like numbers are used to indicate like and corresponding parts.

As described, surface coatings may be applied onto one or more panels prior to installing the one or more panels onto an aircraft. It may be difficult to accurately remove a portion of the coatings prior to coupling the plurality of nutplates used in fastening the one or more panels to the aircraft. Described herein are various systems and methods that provide an improvement in surface preparation of the one or more panels by using an automated laser system.

Figure 1:
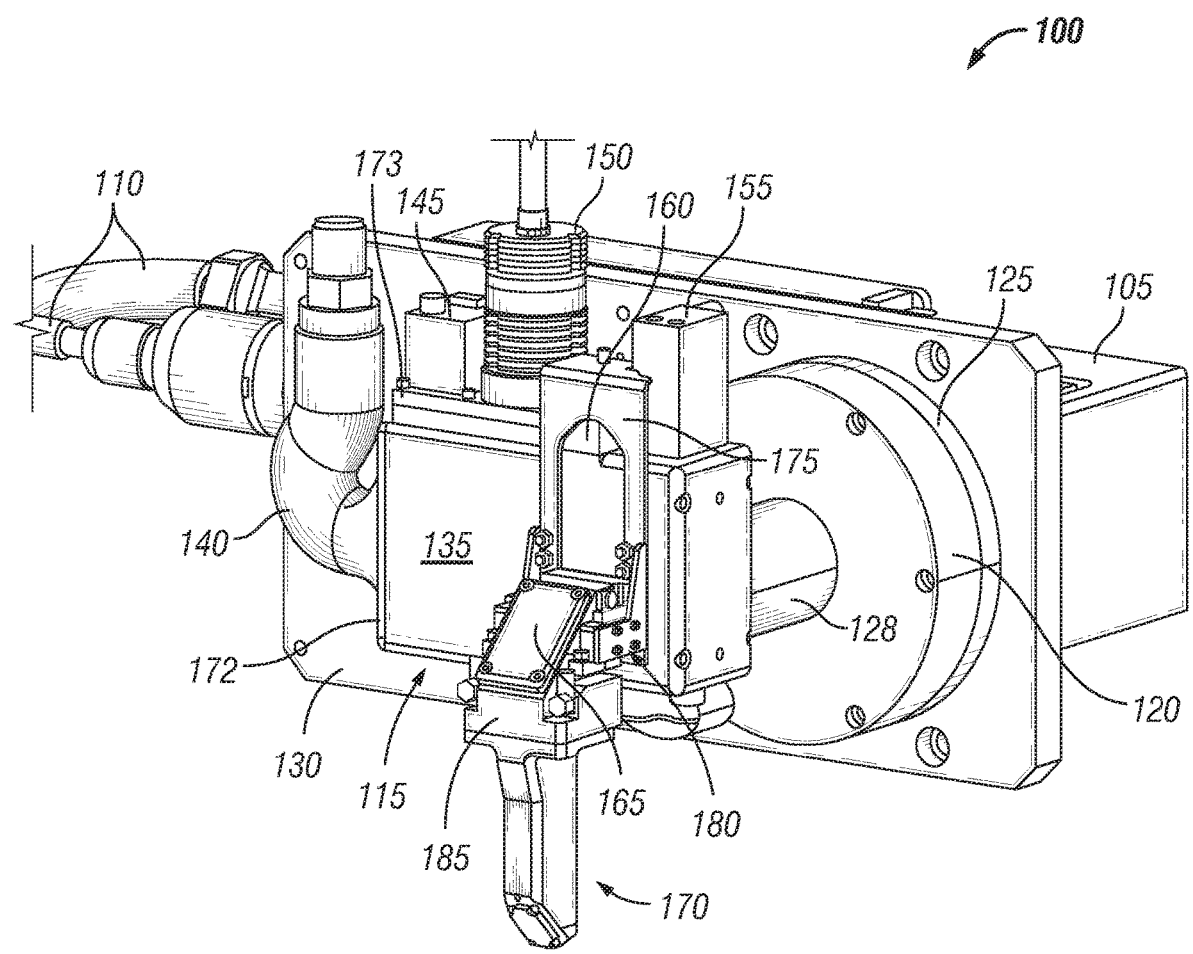
FIG. 1 illustrates an example automated laser system, according to certain embodiments.

FIG. 1 illustrates an isometric view of an automated laser system 100. The automated laser system 100 may be configured to produce and direct a laser onto a surface of one or more sections of understructure to remove at least a portion of a coating disposed on the surface of the one or more sections of understructure. In one or more embodiments, the automated laser system 100 may be coupled to an external actuator configured to move the automated laser system 100 to numerous locations. Without limitations, the automated laser system 100 may be coupled to a robotic arm capable of movement about six separate axes. In those embodiments, movement of the automated laser system 100 about the robotic arm may be pre-programmed into a controller. In one or more embodiments, the automated laser system 100 may comprise a laser scanner 105, one or more cables 110, and a laser head 115. In embodiments, the laser scanner 105 may be configured to direct a laser through the automated laser system 100. Without limitations, the laser may be configured to operate in a predefined scanning pattern. In embodiments, the laser scanner 105 may be any suitable size, height, shape, and combinations thereof. The laser scanner 105 may comprise one or more galvanometer scanning mirrors. As illustrated the laser scanner 105 may be communicatively coupled to an external controller and/or a laser source via the one or more cables 110. In embodiments, the one or more cables 110 may be any suitable electrical cabling. Without limitations, the one or more cables 110 may be coaxial cable, communications cable, metallic sheathed cable, non-metallic sheathed cable, fiber optic cable, and combinations thereof. In embodiments, the one or more cables 110 may comprise at least one communications cable and at least one fiber optic cable. During operations the external controller may control the movement and operation of the automated laser system 100. In one or more embodiments, the external controller may include one or more interface(s), processing circuitry, memory(ies), and/or other suitable element(s). Interface receives input, sends output, processes the input and/or output, and/or performs other suitable operation. Interface may comprise hardware and/or software. In further embodiments, the laser source may be disposed external to the laser scanner 105, and it may transmit a laser to the laser scanner 105 via the one or more cables 110.

Processing circuitry performs or manages the operations of the component. Processing circuitry may include hardware and/or software. Examples of a processing circuitry include one or more computers, one or more microprocessors, one or more applications, etc. In certain embodiments, processing circuitry executes logic (e.g., instructions) to perform actions (e.g., operations), such as generating output from input. The logic executed by processing circuitry may be encoded in one or more tangible, non-transitory computer readable media (such as memory). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory (or memory unit) stores information. Memory may comprise one or more non-transitory, tangible, computer-readable, and/or computer-executable storage media. Examples of memory include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

As further illustrated in FIG. 1, the laser scanner 105 may be coupled to the laser head 115 through a flange 120. As shown, a circular connector 125 may extend from a generally rectangular base 130 of the laser scanner 105. In one or more embodiments, the flange 120 may be disposed about the laser head 115 and may couple the laser head 115 to the laser scanner 105 by being affixed to the connector 125. In one or more embodiments, the flange 120 may be disposed about an end of a conduit 128, wherein an opposing end of the conduit may be disposed about the laser head 115. In embodiments, the laser head 115 may be configured to direct the produced laser from the laser scanner 105 towards a desired, pre-determined location, wherein the produced laser travels along a light path within the conduit 128. In embodiments, the laser head 115 may be any suitable size, height, shape, and combinations thereof. The laser head 115 may comprise a containment unit 135, a vacuum connector 140, a camera system 145, a light source 150, a first actuator 155, a second actuator 160, a first mirror 165, and an end piece 170. The containment unit 135 may be any suitable size, height, shape, and combinations thereof. In embodiments, the containment unit 135 may contain a plurality of internal components (described later in FIG. 3). As illustrated, the remaining components of the laser head 115 may be disposed about the containment unit 135.

For example, the vacuum connector 140 may be disposed about a first side 172 of the containment unit 135. In other embodiments, the vacuum connector 140 may be disposed about any other suitable location of the containment unit 135. In embodiments, the vacuum connector 140 may be configured to clean the interior of the containment unit 135 by providing a means of removing particulates. In one or more embodiments, the vacuum connector 140 may be coupled to a means for vacuuming about an end of the vacuum connector 140. The opposing end of the vacuum connector 140 may be fluidly coupled to the interior of the containment unit 135. During operations, the vacuum connector 140 may provide for the removal of any suitable particulates, fluids, and combinations thereof within the containment unit 135.

In one or more embodiments, the camera system 145 and the light source 150 may be disposed about a top surface 173 of the containment unit 135. In other embodiments, the camera system 145 and the light source 150 may be disposed about any other suitable location of the containment unit 135. In embodiments, any suitable camera system and light source may be used as the disclosed camera system 145 and the light source 150. The camera system 145 and/or the light source 150 may be communicatively coupled to the external controller and may be actuated by the external controller. The camera system 145 may be configured to capture an image through the end piece 170. The light source 150 may be configured to provide a light that is to be directed out of the end piece 170. Without limitations, the light produced may be a blue light or any other suitable color of light.

In one or more embodiments, the first actuator 155 and the second actuator 160 may be disposed about the top surface 173 of the containment unit 135 in addition to the camera system 145 and the light source 150. In other embodiments, the first actuator 155 and the second actuator 160 may be disposed about any other suitable location of the containment unit 135. The first actuator 155 may be configured to displace an internal component within the containment unit 135 (i.e., third internal mirror 210 in FIG. 2). The second actuator 160 may be configured to displace the end piece 170. In one or more embodiments, the first actuator 155 and the second actuator 160 may be linear actuators capable of displacing an object along a singular axis (for example, along a vertical direction). In one or more embodiments, the first actuator 155 and the second actuator 160 may be the same type of actuators. In alternate embodiments, the first actuator 155 and the second actuator 160 may be different types of actuators.

As illustrated, the second actuator 160 may displace the end piece 170 via a linkage 175. In embodiments, the end piece 170 may be coupled to a fastening structure 180. The fastening structure 180 may be coupled to an end of the linkage 175. The opposing end of the linkage 175 may be coupled to the second actuator 160. In embodiments, the linkage 175 and the fastening structure 180 may be any suitable size, height, shape, and combinations thereof. In embodiments, the fastening structure 180 may comprise any suitable fasteners such as, but not limited to, nuts, bolts, screws, pins, washers, clamps, clips, retaining rings, and combinations thereof. As illustrated, the fastening structure 180 may comprise a base 185 and the first mirror 165. The base 185 may be any suitable size, height, shape, and combinations thereof. In embodiments, the base 185 may be coupled to the end piece 170 via guide pins and/or other suitable fasteners. In embodiments, the base 185 may comprise an internal bore (not shown) that is concentric to the internal bore of the end piece 170 (described further in FIG. 4A). The internal bore of the base 185 may be coupled to a perpendicular bore of the fastening structure 180 (not shown) through the first mirror 165. In one or more embodiments, the first mirror 165 may be disposed on top of the base 185 at a suitable angle. Without limitations, the first mirror 165 may be disposed on top of the base 185 at an angle of about 45 degrees in relation to the bottom of the base 185. The disposition of the first mirror 165 may be configured to direct a light path (for example, from the laser scanner 105, the camera system 145, the light source 150, and combinations thereof) through the fastening structure 180 to the base 185 and subsequently to the end piece 170.

Figure 2:
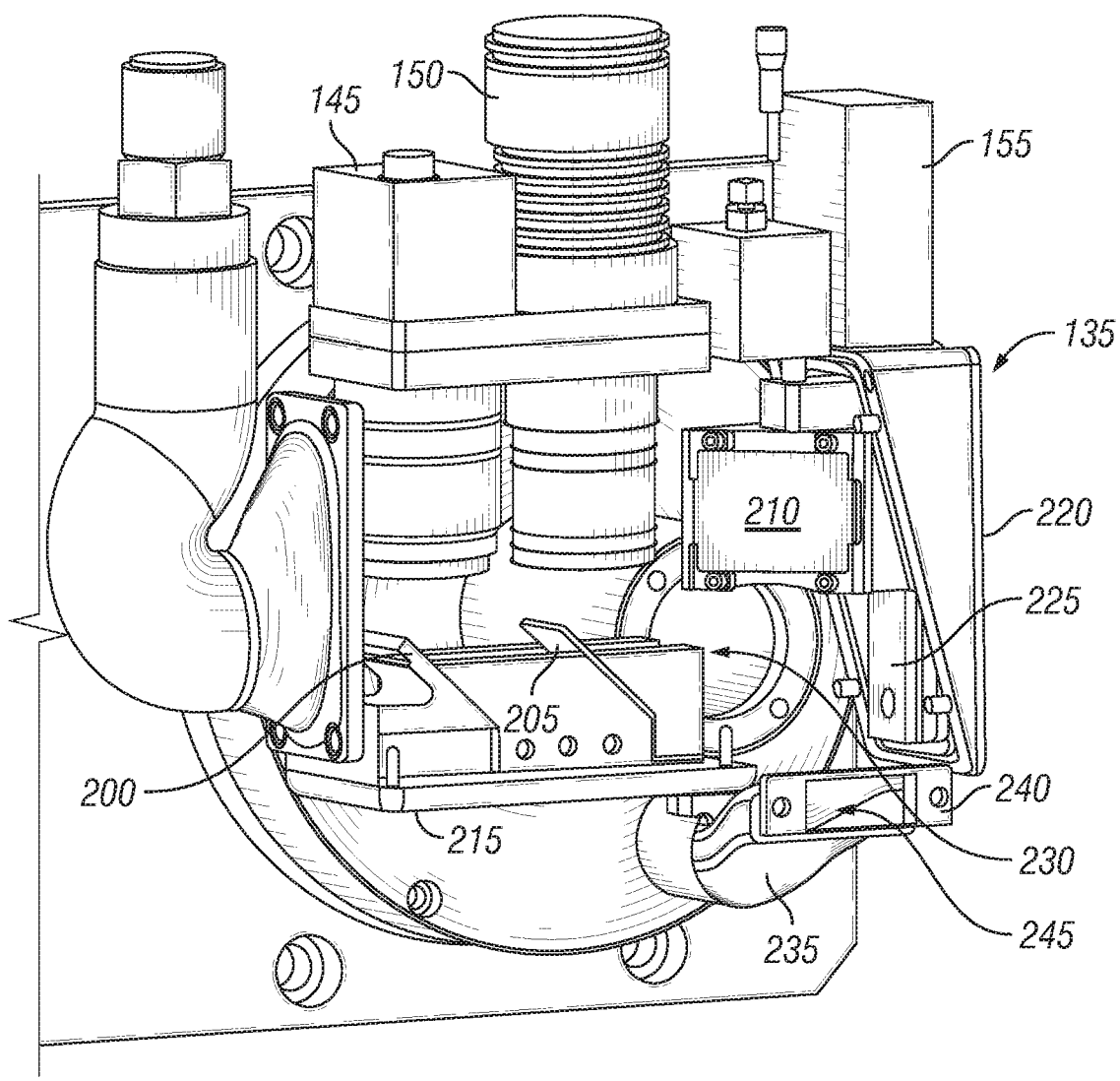
FIG. 2 illustrates an isometric cross-section of a containment unit of the automated laser system in FIG. 1, according to certain embodiments.

FIG. 2 illustrates an isometric view of an interior of the containment unit 135. As illustrated, there may be a first internal mirror 200, a second internal mirror 205, and a third internal mirror 210 disposed within the interior of the containment unit 135. The first internal mirror 200 may be disposed within a light path produced by the camera system 145 and on a bottom side 215 of the containment unit 135. The second internal mirror 205 may be disposed within a light path produced by the light source 150 and on the bottom side 215 of the containment unit 135. In one or more embodiments, the third internal mirror 210 may be disposed within a light path directed by the first internal mirror 200 and/or the second internal mirror 205. The third internal mirror 210 may disposed about a portion of the first actuator 155, wherein the first actuator 155 is configured to displace the third internal mirror 210 into and out of the light path directed by the first internal mirror 200 and/or the second internal mirror 205. In one or more embodiments, the first actuator 155 may displace the third internal mirror 210 vertically into and/or out of the light path directed by the first internal mirror 200 and/or the second internal mirror 205 through execution of the external controller.

In one or more embodiments, the first internal mirror 200, the second internal mirror 205, and the third internal mirror 210 may be disposed at any suitable angle. Without limitations, the first internal mirror 200 and the second internal mirror 205 may be disposed at an angle of about 45 degrees in relation to the bottom surface 215 of the containment unit 135. Without limitations, the third internal mirror 210 may be disposed at an angle of about 45 degrees in relation to a second side 220 of the containment unit 135, wherein the second side 220 is opposite to the first side 172 (referring to FIG. 1). In one or more embodiments, the first internal mirror 200 and the second internal mirror 205 may be disposed so as to direct light paths towards the third internal mirror 210. In one or more embodiments, the third internal mirror 210 may be angled so as to direct an incoming light path perpendicularly away from the containment unit 135, wherein the light path may be directed in a direction opposite to the direction of the laser scanner 105 (referring to FIG. 1). During operations, the third internal mirror 210 may translate vertically along a rail 225 of the first actuator 155 disposed against the internal side of the second side 220.

As further illustrated, the conduit 128 (referring to FIG. 1) may be communicatively coupled to the interior of the containment unit 135. A light path travelling along a bore 230 within the conduit 128 may be concentric to the perpendicular bore of the fastening structure 180 (referring to FIG. 1). In one or more embodiments, the third internal mirror 210 may be in an initial position within the light path of the first internal mirror 200 and/or the second internal mirror 205. In the initial position, the third internal mirror 210 may block the bore 230 from the perpendicular bore of the fastening structure 180. During operation, the first actuator 155 may be actuated to displace the third internal mirror 210 from the initial position to a secondary position. In embodiments, there may be a vertical offset between the initial position and the secondary position, thereby providing an open space between the bore 230 and the perpendicular bore of the fastening structure 180.

FIG. 2 further illustrates a secondary vacuum connector 235. The secondary vacuum connector 235 may be disposed below the containment unit 135. A first end 240 of the secondary vacuum connector 235 may be coupled to the base 185 (referring to FIG. 1) of the fastening structure 180. In one or more embodiments, an internal bore 245 of the secondary vacuum connector 235 may be communicatively coupled to the end piece 170 (referring to FIG. 1). In embodiments, an opposing end to the first end 240 may be coupled to a means for vacuuming. During operations, the secondary vacuum connector 235 may be configured to remove any particulates about an end of the end piece 170.

Figure 3A:
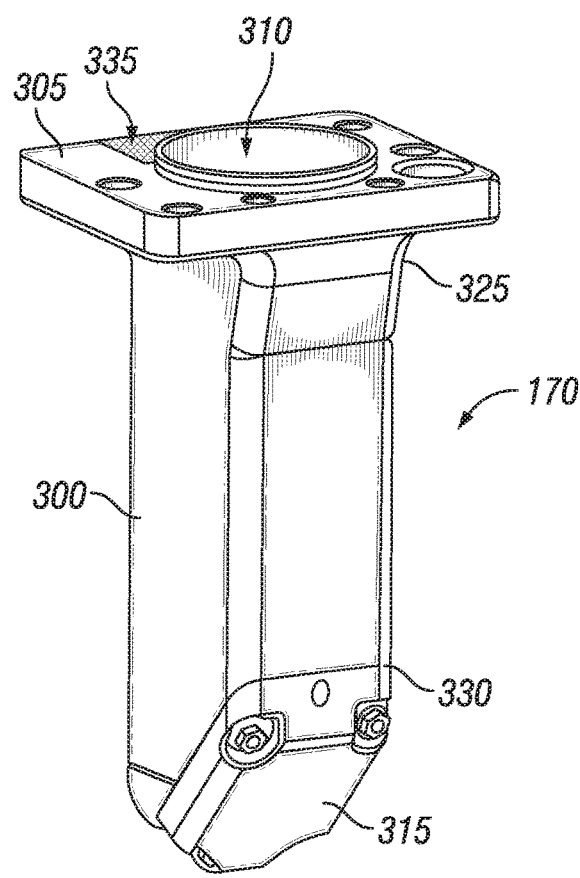
FIG. 3A illustrates an example end piece, according to certain embodiments.
Figure 3B:
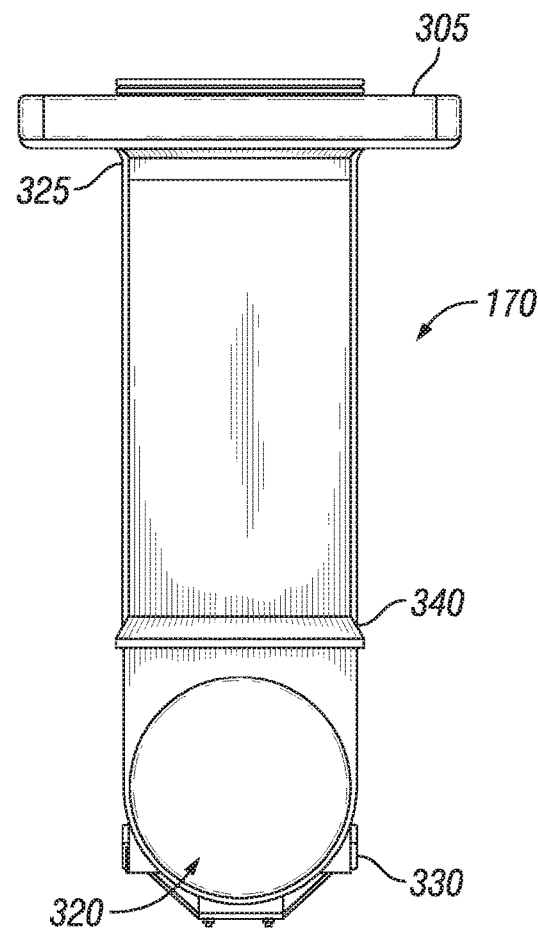
FIG. 3B illustrates the end piece in FIG. 3A at a front view, according to certain embodiments.

FIGS. 3A and 3B illustrate the end piece 170. FIG. 3A illustrates an isometric view of the end piece 170, and FIG. 3B illustrates a front view of the end piece 170. The end piece 170 may be any suitable size, height, shape, and configurations thereof. As illustrated, the end piece 170 may comprise a body 300, an attachment flange 305, a central bore 310, a second mirror 315, and an outlet 320. In embodiments, the body 300 may generally have a square or rectangular cross-sectional shape. In some embodiments, the body 300 may have varying dimensions along the length of the body 300. The attachment flange 305 may be disposed at a first end 325 of the body 300. The attachment flange 305 may be configured to be coupled to the base 185 (referring to FIG. 1) of the fastening structure 180 (referring to FIG. 1). In embodiments, the attachment flange 305 may be any suitable size, height, shape, and combinations thereof. Without limitations, the attachment flange 305 may have a square or rectangular cross-sectional shape.

In embodiments, the central bore 310 may be accessible at the attachment flange 305 and at the outlet 320. The central bore 310 may be any suitable size, shape, length, and combinations thereof. In embodiments, the length of the central bore 310 may be the same as the combined length of the body 300 and the thickness of the attachment flange 305. In one or more embodiments, the central bore 310 may be uniformly circular throughout its entire length. Without limitations, the central bore 310 may have a diameter that is about $3/16$ inches, about $1/4$ inches, about $5/16$ inches, about $3/8$ inches, or any other suitable standard increment.

In one or more embodiments, the second mirror 315 may be disposed at a second end 330 of the body 300, wherein the second end 330 is opposite to the first end 325. In one or more embodiments, the second mirror 315 may be disposed at any suitable angle. Without limitations, the second mirror 315 may be disposed at an angle of about 45 degrees in relation to the central axis of the body 300. During operations, a light path may travel through the central bore 310 of the body 300. In these embodiments, the second mirror 315 may be configured to direct the light path out of the central bore 310 and through the outlet 320 at an angle in relation to the central axis of the body 300. Without limitations, the directed light path may exit the outlet 320 perpendicular to the central axis of the body 300. In embodiments, the outlet 320 may be any suitable size and/or shape. The outlet 320 may be an opening of the body 300 configured to allow access to the central bore 310.

As illustrated, there may be a vacuum bore 335 disposed within the body 300. The vacuum bore 335 may be configured to communicatively couple the secondary vacuum connector 235 (referring to FIG. 2) to the second end 330 of the body 300. During operations, as the laser head 115 (referring to FIG. 1) operates, particulates of coatings previously applied to the one or more panels may be generated. As the particulates are produced, a means of vacuuming may be applied to the desired area to remove the particulates. In one or more embodiments, a means of vacuuming may draw the particulates into the vacuum bore 335 through a vacuum port 340 disposed about the second end 330 of the body 300. In embodiments, the vacuum port 340 may be an opening configured to allow access to the vacuum bore 335

With reference to FIGS. 1-3B, the method as presented in the present disclosure may be described. An operator may utilize the automated laser system 100 to remove a portion of coatings present on one or more panels prior to nutplate installation. Specifically, the automated laser system 100 may be used to remove a portion of the coatings present around a plurality of predrilled holes.

Initially, the automated laser system 100 may index the plurality of predrilled holes. The automated laser system 100 may utilized pre-programmed routes and/or locations for each of the one or more panels via the external controller. In embodiments, the automated laser system 100 may be disposed near one of the plurality of predrilled holes. The automated laser system 100 may determine the center of the one of the plurality of predrilled holes based on the pre-programmed instructions of the external controller. The automated laser system 100 may measure any offsets in the X & Y axes of the actual center in relation to the center determined by the pre-programmed instructions. In embodiments, if the actual center is outside of an allowable tolerance, the external controller may instruct the robotic arm, the automated laser system 100, or both to re-adjust so that the automated laser system 100 is within the allowable tolerance. Without limitations, the allowable tolerance may be from about 0.1 mm to about 4 mm. In these embodiments, the third internal mirror 210 may be in the initial position within the light path of the first internal mirror 200 and/or the second internal mirror 205. The actual center and measured offsets may be determined by utilizing the camera system 145 and the light source 150. In embodiments, if the actual center is within an allowable tolerance, the automated laser system 100 may be actuated to operate the laser scanner 105.

During operations, the laser scanner 105 may be actuated to direct a laser that will travel along a light path through the automated laser system 100 and out of the end piece 170. In one or more embodiments, the laser scanner 105 may operate at a frequency of about 100 kHz. Prior to actuating the laser scanner 105, the third internal mirror 210 may be actuated to translate to the secondary position, thereby providing access between the bore 230 and the perpendicular bore of the fastening structure 180. In embodiments, the laser may travel along a light path from the laser scanner 105, through the core 230, through the perpendicular bore of the fastening structure 180, deflected by the first mirror 165 to travel through the central bore 310 of the end piece 170, and deflected by the second mirror 315 to travel out through the outlet 320 of the end piece 170.

As the automated laser system 100 operates, a means of vacuuming may be operating as well. In embodiments, the means of vacuuming may operate concurrently with, prior to, subsequent to, and combinations thereof of the actuation of the laser scanner 105. As the laser produced by the laser scanner 105 removes at least a portion of the coatings disposed on the one or more panels around the plurality of predrilled holes, the means of vacuuming may remove any particulates generated by such operation.

Upon completion of the actuation of the laser scanner 105, the automated laser system 100 may perform an optical inspection of the cleaned surface area. In these embodiments, the third internal mirror 210 may be actuated to translate back to the initial position in order to use the camera system 145 and the light source 150 to inspect the surface area near the outlet 320 of the end piece 170. If the automated laser system 100 determines that the surface area is acceptably clean, the automated laser system 100 may move on to the next one of the plurality of predrilled holes and repeat the process. If the automated laser system 100 determines that the surface area is not acceptably clean, the automated laser system 100 may perform a secondary operation to remove remaining coatings by repeating the previously disclosed methodology above.

Technical advantages of this disclosure may include one or more of the following. The automated laser system 100 described herein may reduce the amount of scrap, rework, and repair associated with disbonding nutplates. The automated laser system 100 may reduce the amount of time needed for installation in comparison to manual techniques.

The present disclosure may provide numerous advantages, such as the various technical advantages that have been described with respective to various embodiments and examples disclosed herein. Other technical advantages will be readily apparent to one skilled in the art from the following figures, descriptions, and claims. Moreover, while specific advantages have been enumerated in this disclosure, various embodiments may include all, some, or none of the enumerated advantages.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An automated laser system, comprising:
   a laser scanner; and
   a laser head, wherein the laser head is coupled to the laser scanner, wherein the laser head comprises:
   a containment unit;
   a vacuum connector, wherein the vacuum connector is disposed on a first side of the containment unit;
   a camera system, wherein the camera system is disposed on a top surface of the containment unit;
   a light source, wherein the light source is disposed on the top surface of the containment unit;
   a first actuator, wherein the first actuator is disposed on the top surface of the containment unit;
   a second actuator, wherein the second actuator is disposed on the top surface of the containment unit, wherein the light source is disposed between the camera system and the second actuator, wherein the second actuator is disposed between the light source and the first actuator; and an end piece, wherein the second actuator is configured to displace the end piece.

2. The automated laser system of claim 1, wherein a laser source and an external controller are communicatively coupled to the laser scanner via one or more cables.

3. The automated laser system of claim 2, wherein the one or more cables comprise a fiber optic cable and a communications cable.

4. The automated laser system of claim 1, wherein the automated laser system is coupled to a robotic arm capable of movement about six separate axes.

5. The automated laser system of claim 1, wherein the end piece is coupled to a fastening structure, wherein the fastening structure is coupled to an end of a linkage, wherein an opposing end of the linkage is coupled to the second actuator.

6. The automated laser system of claim 5, wherein the fastening structure comprises a base, a first mirror, and a perpendicular bore.

7. The automated laser system of claim 6, wherein the first mirror is disposed on top of the base, wherein the base comprises an internal bore, wherein the internal bore and the perpendicular bore are communicatively coupled.

8. The automated laser system of claim 1, wherein the end piece comprises a body, an attachment flange, a central bore, a second mirror, an outlet, a vacuum bore, and a vacuum port.

9. The automated laser system of claim 8, wherein the attachment flange is disposed at a first end of the body, wherein the second mirror and the outlet are disposed at a second end of the body.

10. The automated laser system of claim 8, wherein the central bore has a diameter of 3/16 inches, 1/4 inches, 5/16 inches, or 3/8 inches.

11. The automated laser system of claim 1, wherein the containment unit comprises a first internal mirror, a second internal mirror, a third internal mirror, and a rail.

12. The automated laser system of claim 11, wherein the first internal mirror is disposed within a light path produced by the camera system and on a bottom side of the containment unit, wherein the second internal mirror is disposed within a light path produced by the light source and on the bottom side of the containment unit.

13. The automated laser system of claim 11, wherein the third internal mirror is disposed onto the rail of the first actuator, wherein the first actuator is configured to translate the third internal mirror, wherein the rail is disposed on an internal side of a second side of the containment unit.

14. An automated laser system, comprising:
a laser scanner; and
a laser head coupled to the laser scanner, the laser head comprising:
a containment unit;
a vacuum connector disposed on the containment unit;
a camera system disposed on the containment unit;
a light source disposed on the containment unit;
a first actuator disposed on the containment unit;
a second actuator disposed on the containment unit, wherein the light source is disposed between the camera system and the second actuator, wherein the second actuator is disposed between the light source and the first actuator; and
an end piece, wherein the second actuator is configured to displace the end piece.

15. The automated laser system of claim 14, wherein a laser source and an external controller are communicatively coupled to the laser scanner via one or more cables.

16. The automated laser system of claim 14, wherein the automated laser system is coupled to a robotic arm capable of movement about six separate axes.

17. The automated laser system of claim 14, wherein:
the end piece is coupled to a fastening structure;
the fastening structure is coupled to an end of a linkage;
an opposing end of the linkage is coupled to the second actuator; and
the fastening structure comprises a base, a first mirror, and a perpendicular bore.

18. The automated laser system of claim 14, wherein the end piece comprises a body, an attachment flange, a central bore, a second mirror, an outlet, a vacuum bore, and a vacuum port.

19. The automated laser system of claim 14, wherein the containment unit comprises a first internal mirror, a second internal mirror, a third internal mirror, and a rail.

20. The automated laser system of claim 19, wherein:
the first internal mirror is disposed within a light path produced by the camera system; and
the second internal mirror is disposed within a light path produced by the light source.

* * * * *